Patented Aug. 10, 1948

2,446,574

UNITED STATES PATENT OFFICE 2,446,574

METHOD OF PREPARING PENICILLIN

Chester J. Cavallito, Rensselaer, and Frederick K. Kirchner, Albany, N. Y., assignors, by mesne assignments, to Winthrop-Stearns Inc., New York, N. Y., a corporation of Delaware No Drawing. Application January 15, 1944, Serial No. 518,458

8 Claims. (Cl. 260—236.5)

This invention relates to a process for obtaining a penicillin preparation of high antibacterial activity.

In accordance with this invention, penicillin preparations such as those used at present therapeutically or concentrates obtained according to various known methods [such as those revealed by: Meyer et al., Science, 96, 20 (1942); Catch et al., Nature, 150, 633 (1942); Abraham et al., Brit. J. Exp. Path., 23, 103 (1942)] may be further purified by removal of associated impurities, such as pigments, with resultant enhancement of antibacterial activity.

Methods for the partial purification of penicillin have been described by Catch et al. [Nature, 150, 633 (1942)] and by Abraham and Chain [Nature, 149, 328 (1942)]. According to the method of Catch and co-workers, a solution of penicillin in ether or ethyl acetate is passed through a column composed of silica gel associated with a small amount of an inorganic base such as a hydroxide or carbonate of an alkali or alkaline earth metal. The constituents of the penicillin preparation are separated on the column primarily according to the strength of the component acids. The differences in acid strength are magnified by repeated neutralization and acidification. Using this method, Catch et al. obtained a product containing 750 units of penicillin per milligram. Abraham and Chain chromatographed penicillin solutions on an alumina column and treated the active fraction with aluminum amalgam. This procedure was repeated until the alumina column appeared homogeneous. The preparation thus obtained had an activity of 450–500 units of penicillin per milligram.

Both of the above methods employ adsorbing agents which require tedious preparation. Further, we have found that the use of alumina as an adsorbing agent in the purification of penicillin solutions leads to a large decrease in the total antibacterial activity of the preparation during the purification process. By contrast, our process has the advantages of retaining all except a very small portion of the total antibacterial activity of the preparation being purified and of employing simply-obtained adsorbing agents.

Briefly, our new process consists in removing impurities insoluble in the aqueous penicillin preparation at pH 2.5 to 3.0, further removing soluble impurities by extraction with water-immiscible solvents, then transferring the penicillin to a water-immiscible solvent and freeing it from both more soluble and less soluble impurities by preferential adsorption on special adsorbents.

In greater detail the steps can be outlined, as follows:

(a) An aqueous solution of impure penicillin in a buffer at pH 7 is prepared by dissolving a dry sample, or by concentrating a more dilute solution, or by partition between the buffer and an ethereal solution, or the like. The aqueous solution should be adjusted to contain 250–750 Oxford units per cc.

(b) The pH of the solution is now adjusted to 2.5 to 3.0, allowed to stand for a short time, preferably less than an hour, and then any precipitate which has formed is removed by filtration, centrifugation or the like. The precipitate can be discarded since it contains little or no antibacterial activity, provided that the initial penicillin concentration is less than 750 Oxford units per cc.

(c) The aqueous filtrate is then extracted with a liquid aliphatic hydrocarbon such as petroleum ether. This serves to remove water-soluble impurities such as aliphatic acids. The hydrocarbon extract is discarded.

(d) The pH of the aqueous solution is now raised to 4.5 to 5.0, preferably 4.8, and then the solution is extracted with ethyl ether. The ethereal extract, which contains pigment impurities, is discarded. During this step it is necessary to maintain control of the pH in the range 4.5 to 5.0 by addition of acid since otherwise the pH of the solution tends to rise due to removal of ether-soluble acids.

(e) The aqueous solution is now adjusted to pH 2.5 to 3.0 and the penicillin removed therefrom by extraction with a small amount of chloroform. The aqueous solution is discarded. Instead of using chloroform in this step other water-immiscible solvents for penicillin such as trichloroethylene, s-tetrachloroethane, dichloroethyl ether, or n-butyl ether may be employed. Generally speaking, such solvents may be classified as aliphatic polyhalohydrocarbons, aliphatic ethers, and halogenated aliphatic ethers.

(f) The chloroform solution of penicillin is now freed of more readily adsorbable and less readily adsorbable impurities, which have a pigment character, by preferential adsorption on a very slightly basic adsorbent such as magnesium ammonium phosphate or urea. To this end the chloroform solution of penicillin is allowed to percolate through a column of the adsorbent, so that the constituents of different adsorptive power are spaced along the height of the column, the most highly adsorbed being at the top of the column and the least adsorbed being at the bottom of the column or in the filtrate, depending on the dimensions of the column and the amount of solvent employed. The penicillin fraction is separated, and the process may be repeated until a product of sufficient purity is obtained.

We have found that magnesium ammonium phosphate, and "aged" urea are unique and especially useful adsorbents to separate penicillin from pigment impurities. These adsorbents are very slightly basic, and have sufficient adsorptive power to be effective, without retaining the penicillin so tightly that it cannot be efficiently removed. Magnesium ammonium phosphate is a particularly satisfactory adsorbent if the penicillin preparation contains pigment impurities less readily adsorbed than penicillin itself. This is the case when the penicillin preparation is obtained from surface cultures, e. g., of *Penicillium notatum* strain 1249. In this case when the chromatogram is prepared, one finds at the bottom of the column a broad band containing the less adsorbable pigment, then above this band a relatively colorless middle band which contains the penicillin, and finally, at the top of the column, a narrow zone containing the most highly adsorbed pigment.

We have found also that urea which has previously been heated to its melting point, or which has been allowed to stand for several months, or which has otherwise been "aged," is a uniquely suitable adsorbent, especially where the penicillin contains no, or at least only slight amounts of, poorly adsorbed variety of pigment impurities. The term "aged" urea as appearing in the claims means urea which has stood for several months in either a closed or open container or which has been heated to its melting point and then cooled; the term thus is intended to include urea other than that which has been recently prepared or recently purified.

Urea, as thus prepared, has less adsorptive power than magnesium ammonium phosphate, and this is an advantage if the penicillin contains no pigments of the poorly adsorbed variety, for then it is possible to use relatively small amounts of solvent and collect the purified penicillin in the filtrate, the adsorbed pigments being retained on the urea. This method is particularly applicable to penicillin obtained from deep cultures, e. g., of *Penicillium notatum* strain 832. This procedure is also suitable for use on penicillin from other strains, if the poorly adsorbed pigments which may then be present are first removed on a magnesium ammonium phosphate column, as described above.

In the foregoing, reference has been made to permissible variations in the procedure when the penicillin is obtained from different strains of *Penicillium notatum*. It may further be mentioned that certain steps in the preliminary purification of the aqueous solution may also be omitted depending on the source of the penicillin. To wit, if the penicillin is derived from *Penicillium notatum* strain 832 steps (b) and (d) can be omitted since the crude penicillin from this strain contains fewer impurities than penicillin obtained from strain 1249. The present process is therefore applicable to penicillin preparations obtained from either surface or deep (submerged) cultures. It is, however, more advantageous to use preparations from the latter source, since they contain less pigment and the purification procedure is somewhat shorter.

The numbers 1249 and 832 are commonly used by workers in this field to identify particular strains of *Penicillium notatum* and refer, respectively, to catalogue numbers 1249.B21 and 832 as listed by the Northern Research Laboratory, U. S. Department of Agriculture, Bureau of Agricultural and Industrial Chemistry, Peoria, Illinois.

Since penicillin solutions retain their antibacterial activity longer at lower temperatures, it is desirable to carry out the extractions at about 10° C. and to have the chromatographic columns jacketed so as to allow cooling by circulation of ice water or brine.

The invention is illustrated by the following examples but is not limited to them.

*Example 1*

The penicillin preparation from a surface culture of *Penicillium notatum* strain 1249 is dissolved or concentrated in an amount of phosphate buffer (0.01 to 0.001 molar phosphate of pH about 7) necessary to produce a solution containing 250–750 Oxford units per cc. This solution is maintained at a temperature of 0°–15° C. while the pH of the solution is adjusted to about 3.0. This is accomplished by adding over a period of about five to twenty minutes a dilute acid such as dilute phosphoric, sulfuric, or hydrochloric acids. Acids which have a strong oxidizing action in dilute aqueous solution, such as nitric acid, should be avoided because they destroy penicillin. After stirring the solution for 10–20 minutes, any precipitate which may form is removed, e. g., by filtration. The clear filtrate is extracted with one-fifth of its volume of a hydrocarbon solvent such as petroleum ether. The petroleum ether is removed and to the aqueous solution are added first sufficient dilute alkali to raise the pH to 4.8, and then one-fourth of its volume of ethyl ether with rapid stirring or shaking. During the course of the extraction the pH is maintained at about 4.8 by addition of dilute acid to the system, the pH being determined by an external glass electrode. After removal of the ether extract, which contains mostly pigment impurities and has very little activity, dilute acid is added to the aqueous solution to lower the pH to 2.8 (2.5–3.0) and a small volume of chloroform is added with stirring or shaking. The chloroform solution so obtained is used for the chromatographic separation.

The chloroform solution is passed through a column packed with $MgNH_4PO_4$; or if the penicillin is very impure or large volumes are to be handled, a 5% $Al_2O_3$–95% $MgNH_4PO_4$ mixture may be used first. After development with chloroform, three bands are visible: an upper broad yellow band, a middle lighter colored band, and a lower thin yellow band. The middle band is cut out mechanically, placed in 0.01 molar phosphate buffer at pH 7.0 and the insoluble $MgNH_4PO_4$ is removed by filtration. The filtrate, which contains the penicillin, is again acidified to pH 2.7–2.8, extracted with chloroform, and chromatographed on $MgNH_4PO_4$. This procedure is repeated several times until the lower thin yellow band no longer appears.

The penicillin is now taken up in chloroform and chromatographed on a column of urea (about 100–150 mesh) which has been previously heated, preferably to above its melting point, or otherwise aged. On the urea column the remaining yellow pigment appears as a broad band, the penicillin being washed through into the filtrate by the development of the column with chloroform. The penicillin is extracted from the chloroform solution with phosphate buffer for storage or extracted with the proper quantity of alkali to form salts which may be isolated by vacuum concentration from the frozen state. Penicillin preparations of this type are practically colorless or very pale yellow and exhibit a three-to ten-fold increase of antibacterial activity over the starting material.

*Example II*

The penicillin preparation from a deep (submerged) culture of *Penicillium notatum* strain 832 is dissolved or concentrated in an amount of phosphate buffer (0.01 to 0.001 molar phosphate of pH about 7) necessary to produce a solution containing 250–750 Oxford units per cc. This solution is maintained at a temperature of 0–15° C. while the pH is adjusted to pH 2.7–2.8. It is then extracted with one-fifth of its volume of petroleum ether, ligroin or other hydrocarbon solvent. A small volume of chloroform is added to the aqueous solution with stirring and shaking, and the aqueous layer removed. The chloroform solution is passed through a column packed with magnesium ammonium phosphate. After development with chloroform, a narrow, yellow band is visible in the upper part of the column, the lower portion of the column being practically colorless. The colored band is cut out mechanically and the remainder of the tube contents is placed in 0.01 molar phosphate buffer at pH 7.0 and the insoluble magnesium ammonium phosphate is removed by filtration. The filtrate may be stored or, if further purification is necessary, it is acidified to pH 2.7–2.8, extracted with chloroform, and chromatographed on aged urea as in Example I.

We claim:

1. The process for purifying a penicillin preparation which comprises extracting an aqueous penicillin solution in a buffer at pH 2.5–3.0 with a liquid aliphatic hydrocarbon, thereafter removing the penicillin from the aqueous phase by extraction with a water-immiscible organic solvent for penicillin, and separating the penicillin in said organic solvent from pigment impurities by preferential adsorption on an adsorbent of the class consisting of magnesium ammonium phosphate and "aged" urea.

2. The process for purifying a penicillin preparation which comprises adjusting an aqueous penicillin solution in a buffer to pH 2.5–3.0, removing any insoluble impurities, extracting the aqueous solution with a liquid aliphatic hydrocarbon, raising the pH of the aqueous solution to pH 4.5–5.0 and maintaining it at this pH while extracting said aqueous solution with ethyl ether, lowering the pH of the aqueous solution to 2.5–3.0 and removing the penicillin from the aqueous phase by extraction with a water-immiscible organic solvent for penicillin, and separating the penicillin in said organic solvent from pigment impurities by preferential adsorption on an adsorbent of the class consisting of magnesium ammonium phosphate and "aged" urea.

3. The process for purifying a penicillin preparation which comprises adjusting an aqueous penicillin solution in a buffer to pH 2.5–3.0, removing any precipitated insoluble impurities, extracting the aqueous solution with petroleum ether, raising the pH of the aqueous solution to pH 4.5–5.0 and maintaining it at this pH while extracting said aqueous solution with ethyl ether, lowering the pH of the aqueous solution to 2.5–3.0 and removing the penicillin from the aqueous phase by extraction with chloroform, percolating said chloroform solution through a column of magnesium ammonium phosphate whereby the penicillin is adsorbed on the magnesium ammonium phosphate in a relatively colorless zone bordered by pigmented zones of impurities, separating the zone of penicillin adsorbed on the magnesium ammonium phosphate from the pigment zones and isolating the purified penicillin therefrom by extracting it from the magnesium ammonium phosphate with an aqueous solution buffered to pH 7.

4. Process according to claim 3 in which the penicillin is subsequently further purified by percolating it in chloroform solution through a column of "aged" urea, and developing the chromatogram with chloroform whereby pigment is retained on the urea while the penicillin passes into the filtrate, the penicillin being recovered thereafter from the chloroform filtrate.

5. The process for purifying a penicillin preparation which comprises extracting an aqueous penicillin solution in a buffer at pH 2.5–3.0 with petroleum ether, removing the penicillin from the aqueous phase by extraction with chloroform, percolating said chloroform solution through a column of "aged" urea, whereby pigment is retained on the urea, developing the column with chloroform and isolating the purified penicillin from the filtrate.

6. The process for removing pigment impurities from a penicillin preparation which comprises percolating the penicillin in a water-immiscible organic solvent through a column composed of an adsorbent selected from the class consisting of magnesium ammonium phosphate and "aged" urea, whereby the pigment impurities are retained on the column in readily visible zones.

7. The process for removing pigment impurities from a penicillin preparation which comprises percolating the penicillin in chloroform solution through a column of magnesium ammonium phosphate, whereby after development of the column with chloroform the chromatogram appears as a relatively colorless zone of penicillin bordered by readily visible zones of pigment impurities, separating the zone of penicillin adsorbed on the magnesium ammonium phosphate and isolating the penicillin therefrom.

8. The process for removing pigment impurities from a penicillin preparation which comprises percolating the penicillin in chloroform solution through a column of "aged" urea, developing the chromatogram with chloroform, and isolating the penicillin from the filtrate.

CHESTER J. CAVALLITO.
FREDERICK K. KIRCHNER.

REFERENCES CITED

The following references are of record in the file of this patent:

British Journal of Experimental Pathology, vol. 23, June, 1942, No. 3, pp. 103–114.
Lancet, Aug. 16, 1941; pp. 177–180.
Canadian Chemistry and Process Industries, Sept., 1943, p. 532.